US010772803B2

(12) United States Patent
Omura

(10) Patent No.: US 10,772,803 B2
(45) Date of Patent: Sep. 15, 2020

(54) MEDICINE FEEDER AND TABLET SPLITTING APPARATUS

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 2 days.

(21) Appl. No.: 16/324,012

(22) PCT Filed: Aug. 1, 2017

(86) PCT No.: PCT/JP2017/027849
§ 371 (c)(1),
(2) Date: Feb. 7, 2019

(87) PCT Pub. No.: WO2018/034140
PCT Pub. Date: Feb. 22, 2018

(65) Prior Publication Data
US 2019/0167528 A1 Jun. 6, 2019

(30) Foreign Application Priority Data

Aug. 19, 2016 (JP) ................. 2016-161328

(51) Int. Cl.
A61J 7/00 (2006.01)
B65G 47/14 (2006.01)
A61J 3/00 (2006.01)

(52) U.S. Cl.
CPC ............ A61J 7/0007 (2013.01); A61J 3/00 (2013.01); A61J 7/0076 (2013.01); B65G 47/14 (2013.01)

(58) Field of Classification Search
CPC .......... A61J 7/0007; A61J 3/00; A61J 7/0076; A61J 2200/70; A61J 1/1437; B65G 47/14;
(Continued)

(56) References Cited

U.S. PATENT DOCUMENTS 3,285,387 A * 11/1966 Ochs ................. B67B 3/0645
198/396
5,176,290 A * 1/1993 Schwarzli ............. G07F 11/24
221/200
(Continued)

FOREIGN PATENT DOCUMENTS

JP 49-40050 Y1 11/1974
JP 58-107138 A 6/1983
(Continued)

Primary Examiner — Andrea L Wellington
Assistant Examiner — Liang Dong
(74) Attorney, Agent, or Firm — Birch, Stewart, Kolasch & Birch, LLP

(57) ABSTRACT

A turntable is divided into an inner part (50) and an outer part (40). The angular speed of a large-diameter turntable 40 is made higher than the angular speed of a small-diameter turntable 50, and a tablet transfer path 32 of a straightening guide 30 is configured to be a spiral path extending from an inner end portion 32a to an outer end portion 32b. A tablet contact portion (64) of a tablet holding mechanism is reciprocated with respect to a temporary holding area (62) located before the outer end portion 32b. A tablet is temporarily held in the temporary holding area and when a long narrow blade insertion slit 43 in the large-diameter turntable 40 reaches the temporary holding area, a tablet cutting blade of a tablet cutting mechanism is reciprocated with respect to the temporary holding area and a blade insertion notch (62, 63) to split the tablet.

10 Claims, 9 Drawing Sheets

(58) Field of Classification Search
CPC ........ B65G 33/00; B65G 33/04; B23Q 7/003;
B23Q 7/0001; B23Q 7/00; B23Q 7/002;
B23B 13/00; G07F 17/0092
USPC ...... 225/1; 198/459.8, 397.05; 221/221–222,
221/227, 203, 184, 172, 177, 181, 263,
221/265; 108/24; 312/210.5, 229
See application file for complete search history.

(56) References Cited

U.S. PATENT DOCUMENTS

| | | | | |
|---|---|---|---|---|
| 5,369,940 A | * | 12/1994 | Soloman | B65B 37/12 53/500 |
| 8,074,782 B2 | * | 12/2011 | Charpentier | B29C 49/4205 198/396 |
| 8,430,228 B2 | * | 4/2013 | Herzog | B65G 47/1457 198/392 |
| 8,600,549 B2 | * | 12/2013 | Park | A61J 7/0409 221/122 |
| 8,794,483 B2 | * | 8/2014 | Czarnek | A61J 7/02 221/172 |
| 9,238,555 B2 | * | 1/2016 | Koike | B65B 1/14 |
| 2008/0283358 A1 | * | 11/2008 | Milot | B65G 47/1464 198/392 |
| 2013/0125722 A1 | | 5/2013 | Omura et al. | |
| 2013/0247731 A1 | * | 9/2013 | Kim | A61J 7/0007 83/109 |
| 2016/0167866 A1 | | 6/2016 | Omura | |

FOREIGN PATENT DOCUMENTS

| | | | |
|---|---|---|---|
| JP | 2-193809 A | | 7/1990 |
| JP | 2-205523 A | | 8/1990 |
| JP | 04056124 U | * | 5/1992 |
| JP | 11-226089 A | | 8/1999 |
| JP | 2002-153541 A | | 5/2002 |
| JP | 2011-97969 A | | 5/2011 |
| JP | 2012-179127 A | | 9/2012 |
| JP | 2015-23969 A | | 2/2015 |
| WO | WO 2015/0011890 A1 | | 1/2015 |

* cited by examiner

MEDICINE FEEDER AND TABLET SPLITTING APPARATUS

TECHNICAL FIELD

The present invention relates to a medicine feeder that automatically feeds solid medicines, such as tablets and ampoules, so as to automate the dispensing process carried out in hospitals and pharmacies. Specifically, the present invention relates to a medicine feeder by which many medicines of the same shape are randomly held, aligned by a rotating body, and thus successively discharged one by one.

The present invention also relates to a tablet splitting apparatus obtained by adding a tablet cutting mechanism to the medicine feeder described above.

BACKGROUND ART

An aligning and feeding apparatus (medicine feeder) that conveys, for example, tablets (medicines) of the same shape while aligning them in a row is known, which includes a turntable configured to rotate at a constant speed; a fixed outer wall disposed along an outer periphery of the turntable; a fixed straightening guide configured to guide objects on an upper surface of the turntable outward in a radial direction, the objects being carried and brought into contact with the straightening guide; a lead-out portion passing through the outer wall and configured to lead the objects on the turntable to the outside, the objects being carried over the upper surface of the turntable along the outer wall; a width regulating means for regulating the width of the "led-out" objects in a gap between inner and outer opposite members of the lead-out portion; and a height regulating member configured to regulate the height of the "led-out" objects in front of the lead-out portion (see, e.g., PTL 1).

An alignment-disk rotation type medicine feeder is also known, which is capable of accommodating more medicines by using a cylindrical cassette, instead of a flat disk-like turntable such as that described above (see, e.g., PTLs 2 and 3), The alignment-disk rotation type medicine feeder includes a driving unit secured to, and lined up with, a drawer shelf of a medicine packaging machine for the purpose of power feeding and control; and a medicine cassette configured to be removable from the driving unit for facilitating a medicine adding operation. This medicine feeder is configured to randomly hold many medicines in the intermittently or continuously operate as necessary to discharge the medicines one by one from the medicine cassette.

The medicine cassette of the alignment-disk rotation type medicine feeder includes a container portion configured to accommodate many solid medicines; an alignment disk disposed in the container portion in an axially rotatable state; a plurality of blade-like partition walls large in number and formed on an outer periphery of the alignment disk, the partition walls being configured to evenly divide an annular gap between the container portion and the alignment disk into many compartments; and a divider plate configured to partition off a part of the annular gap, the divider plate being disposed opposite a drop port formed in part of a portion of a bottom of the container portion, the portion forming a lower surface of the annular gap. The medicine cassette is configured such that medicines placed in the compartments are dropped one by one from the drop port by axial rotation of the alignment disk rotationally driven by the driving unit.

There is a medicine feeder of another type which uses a so-called flanged rotating container as a rotating body. The flanged rotating container is recessed downward into a bowl-like inverted conical shape in the center thereof and flanged at an upper edge thereof (see, e.g., PTL 4). Specifically, this medicine feeder includes an axially rotatable rotating container recessed at a center portion thereof to randomly hold solid medicines and flanged at an edge portion thereof to allow the medicines to be arranged in an arc shape; a fixed outer wall disposed along an outer periphery of the rotating container; a straightening guide member configured to guide the medicines in the rotating container from the center portion to the edge portion; a lead-out portion passing through the outer wall and configured to lead the medicines ("led-out" objects) from the edge portion to the outside, the medicines being carried over an upper surface of the edge portion of the rotating container along the outer wall; a height regulating member configured to regulate the height of the "led-out" objects in front of the lead-out portion; and a width regulating member formed by a swinging member on an outer side of inner and outer opposite members of the lead-out portion, the width regulating member being configured to regulate the width of the "led-out" objects by swinging to expand or contract the width of a space on the upper surface of the edge portion of the rotating container; and a feeding mechanism formed by a belt feeding mechanism on an inner side of the inner and outer opposite members, extending to reach the inside of the edge portion of the rotating container, and configured to hold the "led-out" objects between itself and the width regulating member to feed them faster than the speed of the edge portion during rotation of the rotating container.

Of conventional, similar-size medicine feeders of a so-called disk rotation type using a turntable with a flat upper surface as a rotating foody (see, e.g., PTL 1), a so-called alignment-disk rotation type using an alignment disk with partition walls arranged side by side along the outer periphery as a rotating body (see, e.g., PTLs 2 and 3), and a so-called flange rotation type using a flanged rotating container as a rotating body (see, e.g., PTL 4), the disk rotation type is smallest, the alignment-disk rotation type is largest, and the flange rotation type is between the two, in terms of capacity to accommodate medicines. With a large capacity, the medicine feeder is easy to use even when operated to receive medicines only during the non-operation period and not to receive them during successive feeding. With a small capacity, however, the medicine feeder is easier to use when operated in such a manner that medicines are added thereto on an as needed basis.

To accommodate various types of medicines, many medicine feeders of various capacities are arranged in the or the like where medicines cannot be easily put into individual feeders on an as needed basis, the alignment-disk rotation type medicine feeders (see, e.g., PTLs 2 and 3), which are of a practical type, have often been used.

By adding a tablet cutting mechanism (cutter mechanism) to such a medicine feeder, a tablet splitting apparatus is produced, which is capable not only of automatically feeding tablets in a successive and sequential manner, but also of automatically performing a splitting operation which involves cutting each tablet being fed, or already fed, in the center into two halves. The alignment-disk rotation type, which is a proven type in automatic dispensing, is often used in combination with tablet splitting apparatuses of any including a mountable tablet splitting apparatus to be included in a medicine packaging machine (see, e.g., PTL 5), a standalone tablet splitting apparatus (see, e.g., PTLs 6 and 7), and tablet splitting apparatuses having tablet cutting mechanisms with different structures (see, e.g., PTLs 5 to 7).

CITATION LIST

Patent Literature

PTL 1: Japanese Unexamined Patent Application Publication No. 02-193809
PTL 2: Japanese Unexamined Patent Application Publication No 02-205523
PTL 3: Japanese Unexamined Patent Application Publication No. 2002-153541
PTL 4: Japanese Unexamined Patent Application Publication No. 2015-023969
PTL 5: Japanese Unexamined Patent Application Publication No. 11-226089
PTL 6: Japanese Unexamined Patent Application Publication No. 2011-097963
PTL 7: Japanese Unexamined Patent Application Publication No. 2012-179127

SUMMARY OF INVENTION

Technical Problem

In a tablet splitting apparatus using an alignment-disk rotation type medicine feeder, such as that described in PTL 5, a space for mounting the medicine feeder is sacrificed to make room for mounting the tablet cutting mechanism when the tablet splitting apparatus is to be included in the medicine packaging machine.

The alignment-disk rotation type medicine feeder provides accurate successive feeding and reliable operation. However, when the alignment-disk rotation type medicine feeder is included in a standalone tablet splitting apparatus, since the successive feeding of tablets is carried out intermittently, the tablet feeding process may lag behind the tablet cutting process and this may affect the tablet splitting speed.

In the alignment-disk rotation type medicine feeder, moreover, the alignment disk and the like are required to properly fit the tablet shape. Therefore, since the same alignment disk and the like cannot be used for various tablets of different shapes, cost reduction is difficult when tablets of a wide variety of shapes are to be dealt with.

As a solution to this, a technique has been proposed, in which a flange rotation type medicine feeder is modified and applied to a tablet splitting apparatus (see, e.g., PTL 4). The flange rotation type medicine feeder is used here, because it is advantageous over the alignment-disk rotation type medicine feeder in that it can more easily lower its profile and more easily shorten the intervals between tablets which are successively fed.

In terms of these advantages, however, the disk rotation type medicine feeder performs better, in principle, than the flange rotation type medicine feeder. Therefore, it seems more desirable that a tablet cutting mechanism be tablet splitting apparatus.

However, although the conventional, disk rotation type medicine feeder is satisfactorily low in profile, the intervals of successive feeding sometimes become too narrow. That is, when a plurality ox tablets are straightened together, adjacent tablets to be discharged from the lead-out portion or regulating portion may be densely aligned. Then, if the tablets are cut by the tablet cutting mechanism, with the adjacent tablets densely aligned and pushing against each other, the resulting split tablets may vary in size, or more cutting dust may be produced.

Accordingly, a technical challenge is to modify the aligning and feeding mechanism of the disk rotation type medicine feeder such that tablets are successively fed at appropriate intervals which are not too sparse and not too dense, and thereby provide a disk rotation type medicine feeder suitable for use in tablet splitting apparatuses of any types, including both standalone and mountable types.

Solution to Problem

A medicine feeder according to the present invention (first solving means) has been devised to address the challenge described above, and includes a circular or annular turntable having a flat upper surface; a driving unit configured to rotate the turntable in a plane; and a fixed straightening guide disposed directly above the turntable and configured to define a transfer path transferring medicines on the turntable. In the medicine feeder, the turntable includes a small-diameter turntable on an inner side and a large-diameter turntable on an outer side; the driving unit makes an angular speed of the large-diameter turntable higher than an angular speed of the small-diameter turntable; and the transfer path of the straightening guide is a spiral path extending continuously over the upper surface of the small-diameter turntable and the upper surface of the large-diameter turntable, from a point off a rotation center to a point outside the large-diameter turntable.

Another medicine feeder according to the present invention (second solving means) is the medicine feeder according to the first solving means, wherein the large-diameter turntable has many small holes vertically passing therethrough.

Another medicine feeder according to the present invention (third solving means) is the medicine feeder according to the first or second solving means, and further includes a medicine cassette removably mounted above the straightening guide and configured to drop and feed medicines onto an inner end portion of the transfer path, wherein the medicine cassette includes a container portion configured to accommodate and randomly hold many medicines, and a closing portion configured to close an opening of the container portion, the closing portion being attached to the container portion in such a manner as to be capable of being axially rotated relative to the container portion; an interior space of the container portion is divided into a plurality of compartments annularly arranged side by side; the compartments are each configured to accommodate and randomly hold a plurality of medicines; the closing portion has a drop port passing therethrough, the drop port being narrower than the compartments; and when the container portion and the closing portion are relatively axially rotated, with the closing portion attached to the container portion, the drop port moves sequentially from one compartment to another of the container portion.

A tablet splitting apparatus according to the present invention (fourth solving means) includes the medicine feeder according to any one of the first to third solving means; a tablet holding mechanism configured to reciprocate a tablet contact portion with respect to a temporary holding area in the transfer path, the temporary holding area being located above the large-diameter turntable; and a tablet cutting mechanism configured to reciprocate a tablet cutting blade with respect to the temporary holding area.

Another tablet splitting apparatus according to the present invention (fifth solving means) is the tablet splitting apparatus according to the fourth solving means, wherein the large-diameter turntable has a long narrow slit, passing therethrough, the slit being configured to allow the tablet cutting blade to be loosely inserted, therein.

Advantageous Effects of Invention

In the medicine feeder according to the present invention (first solving means), a low-profile, disk rotation type medicine feeder suitable for use in a tablet splitting apparatus is configured such that a turntable for transferring medicines on the upper surface thereof is changed from a conventional single-unit type to a multiple-unit type radially divided into the small-diameter turntable on the inner side and the large-diameter turntable on the outer side, and that the small-diameter turntable is rotated relatively slowly and the large-diameter turntable is rotated relatively quickly. At the same time, the straightening guide disposed directly above the turntable is configured to form a spiral transfer path on the upper surface of the turntable. Then, when tablets are placed into the transfer path at a position close to the rotation center, the tablets are first, transferred in the spiral transfer path outward in the radial direction, as the small-diameter turntable rotates. As the diameter of the transfer path increases, the tablets are brought into alignment while gradually speeding up.

The medicines are then further moved outward in the radial direction and transferred onto the large-diameter turntable. Since the large-diameter turntable rotates faster than the small-diameter turntable in terms of angular speed, the movement of the medicines is rapidly accelerated and the medicines are moved even faster after being transferred onto the large-diameter turntable. Accordingly, even when the medicines are densely arranged before the transfer, they are separated and discharged one by one.

Therefore, by simply setting the angular speeds of the inner and outer turntables appropriately, it is possible to successively feed medicines at appropriate intervals which are not too sparse and not too dense.

Additionally, since the apparatus is applicable to a wide range of medicines, the apparatus does not need to be replaced or adjusted as frequently as before to accommodate different shapes and sizes of medicines to be processed. Thus, in many cases, the same apparatus can be used for various medicines simply by making small adjustments.

The present invention can thus provide a disk rotation type medicine feeder suitable for use in tablet splitting apparatuses of any types, including both standalone and mountable types.

In the medicine feeder according to the present, invention (second solving means), the large-diameter turntable has many small holes vertically passing therethrough. With this configuration, medicines transferred onto the large-diameter turntable are reliably and rapidly accelerated by being slightly caught in the small holes in a microscopic sense, and thus are moved at high speed in the transfer path on the large-diameter turntable. At the same time, most of dust particles from the medicines can be easily separated and removed, as they drop through the small holes to a space under the large-diameter turntable.

In the medicine feeder according to the present invention (third solving means), the medicine cassette configured to downwardly drop and feed medicines that are randomly held therein is modified such that the interior space of the container portion is divided into a plurality of compartments, and then when the container portion and the closing portion are relatively axially rotated, the drop port of the closing portion moves sequentially from one compartment to another of the container portion. Thus, when the medicine cassette is mounted above the straightening guide, with the container portion, up and the closing portion down and with the drop port positioned above the inner end portion of the tablet transfer path, and then the container portion is slowly and/or intermittently axially rotated while the closing portion is being secured in place, medicines are dropped and fed through the drop port. The maximum amount of medicines to be fed here is the capacity of a small compartment, not the capacity of the container portion. Therefore, even if the tablet transfer path is narrow, there is no risk of overflow of medicines, and even if the tablet transfer path is short, medicines lying on top of one another are quickly separated. This makes it easier to avoid an undesired increase in the size of an aligning mechanism which includes the straightening guide and the turntable.

In the tablet splitting apparatus according to the present invention (fourth solving means), the tablet splitting apparatus is obtained by adding the tablet holding mechanism and the tablet cutting mechanism to the medicine feeder. In the transfer path, an appropriate area located above the large-diameter turntable is defined as a temporary holding area, with respect to which the tablet contact portion and the tablet cutting blade of a main part are reciprocated by the tablet holding mechanism and the tablet cutting mechanism. Thus, tablet cutting is performed at the same height as tablet transfer performed by the straightening guide, and both the tablet holding mechanism and the tablet, cutting mechanism are disposed near the temporary holding area. A low-profile, compact, mechanical unit can thus be provided.

In the tablet splitting apparatus according to the present invention (fifth solving means), the large-diameter turntable has a long narrow slit passing therethrough for blade insertion. This slit allows the tablet cutting blade to pass therethrough and to reciprocate with respect to the temporary holding area without interfering with the large-diameter turntable. This makes it possible to carry out cutting of tablets without placing an undesired load on the large-diameter turntable. Moreover, the blade insertion slit, which is a long hole or long narrow notch, can be produced easily and at low cost. Additionally, the blade insertion slit has a dust removal function by which dust particles caused by cutting the tablets are allowed to quickly fail from the cutting position to a space below the turntable. When the large-diameter turntable also has small through-holes (as in the second solving means), this function is exerted far beyond the vicinity of the cutting position.

DESCRIPTION OF EMBODIMENTS

A first embodiment will now be described as an embodiment of a medicine feeder and a tablet splitting apparatus according to the present invention.

The first embodiment illustrated in FIGS. 1 to 11 is an embodiment of all the first to fifth solving means described above.

To simplify the drawings, details of fastening members such as bolts, connecting members such as hinges, drive sources such as electric motors, transmitting members such as belts, electric circuits such as motor drivers, and electronic circuits such as controllers, are not shown, and elements schematically shown are mainly those relevant or necessary to explain the present invention.

FIRST EMBODIMENT

A configuration of the first embodiment, of a tablet splitting apparatus (medicine feeder) according to the present invention will be described with reference to the drawings.

Figure 1:
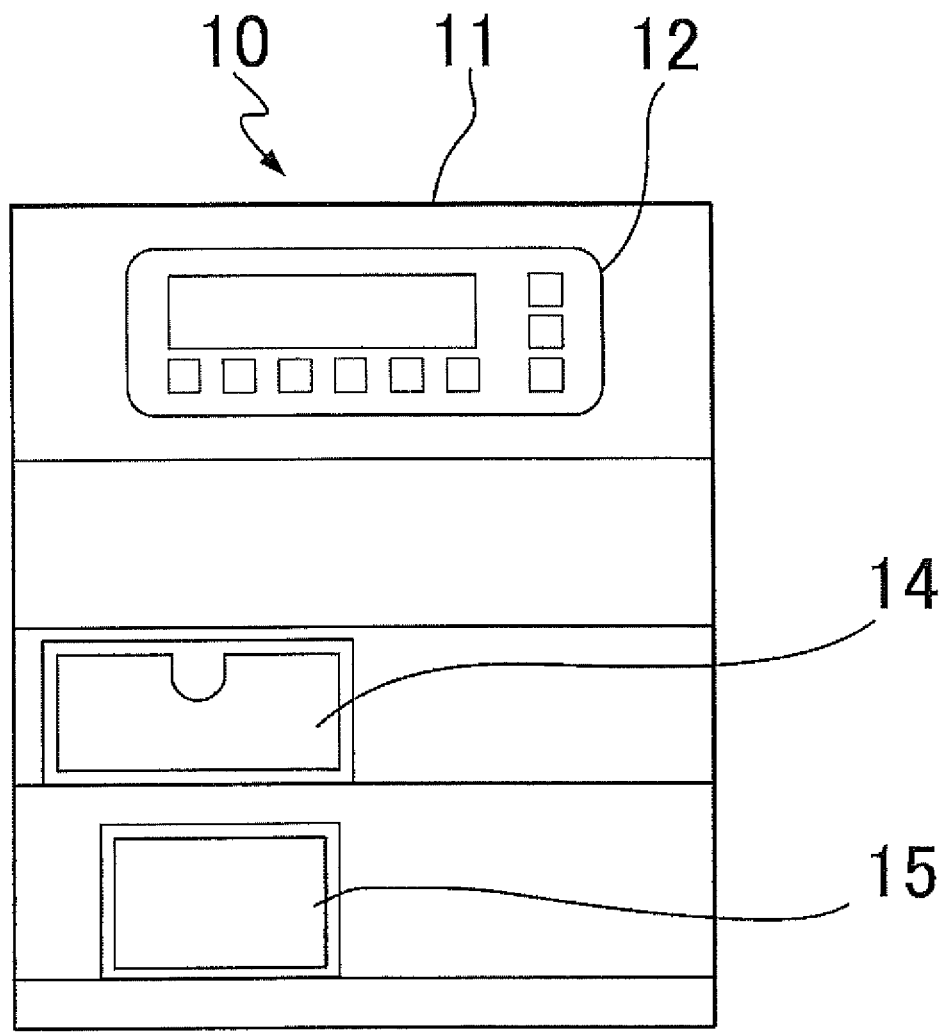
FIG. 1 is a front view illustrating a structure of a stand-alone tablet splitting apparatus (medicine feeder) according to an embodiment of the present invention.
Figure 2:
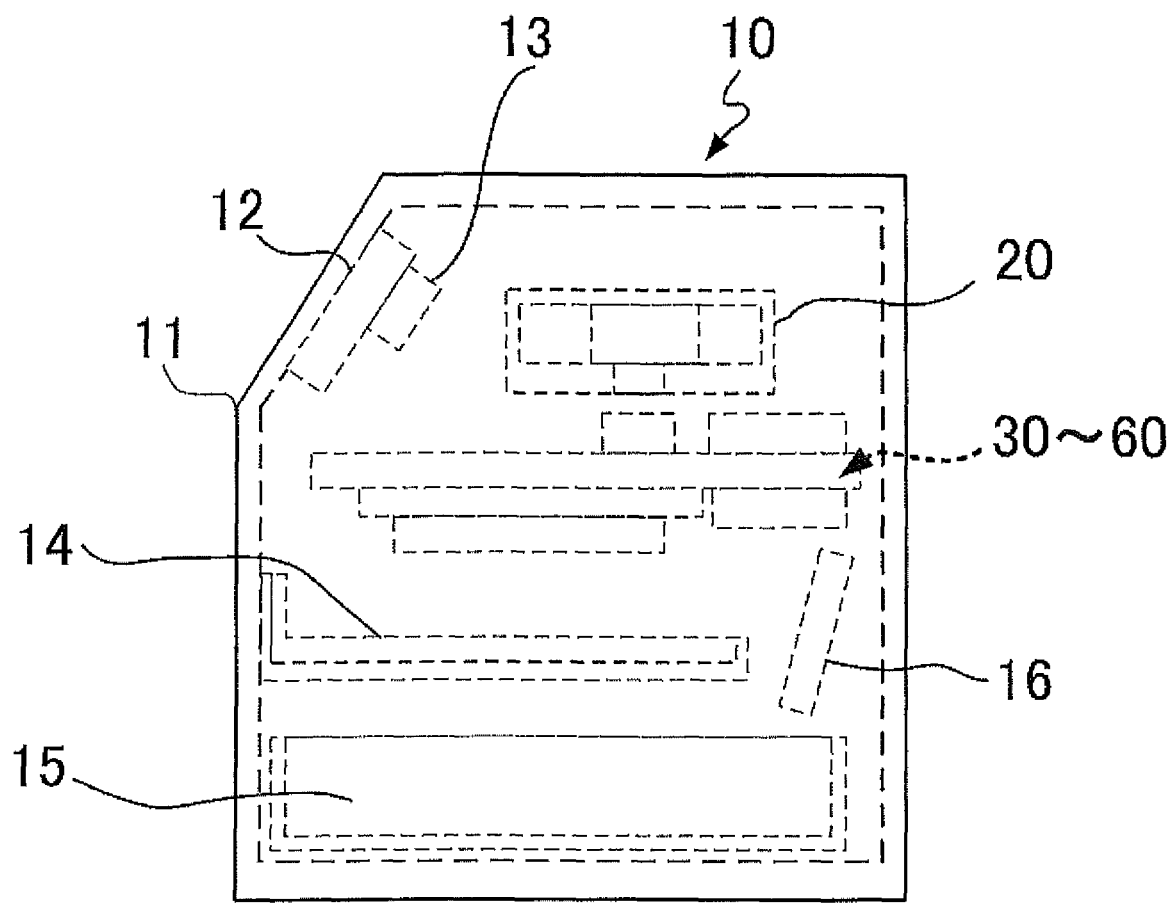
FIG. 2 is a side view illustrating a configuration of the tablet splitting apparatus illustrated in FIG. 1.
Figure 3:
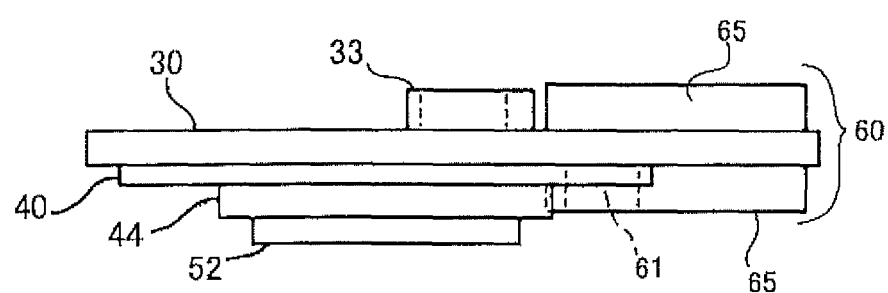
FIG. 3 is a side view illustrating a configuration of a main part of the tablet splitting apparatus illustrated in FIG. 1.
Figure 4:
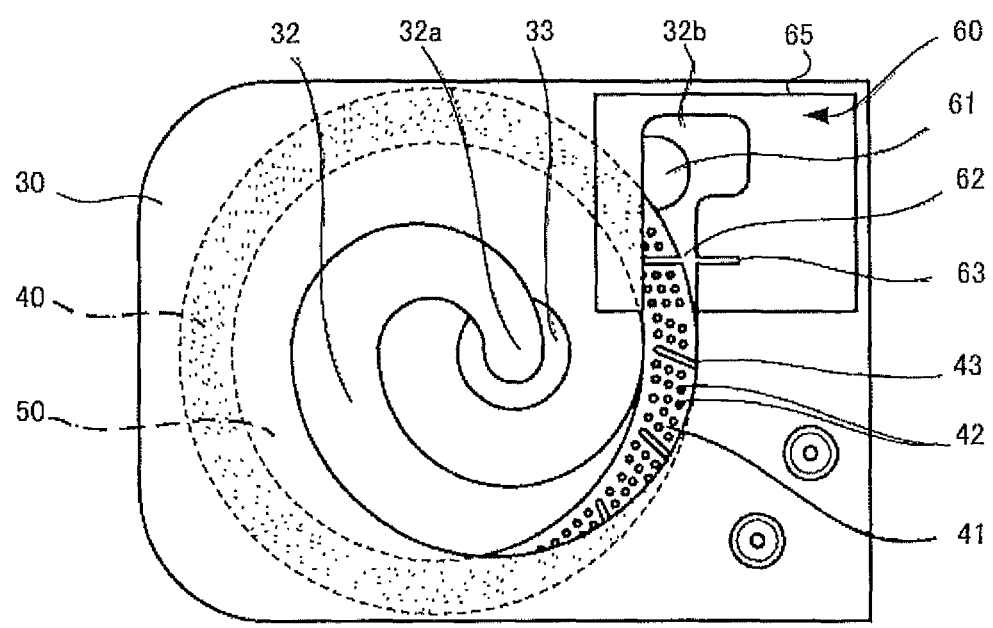
FIG. 4 is a front view illustrating a configuration of the main part illustrated in FIG. 3.

FIG. 1 is a front view of a tablet splitting apparatus 10, FIG. 2 is a right-hand side view of the tablet splitting apparatus 10, FIG. 3 is a side view of tablet aligning and cutting mechanisms 30 to 60 forming a main part of the tablet splitting apparatus 10, and FIG. 4 is a plan view of the tablet aligning and cutting mechanisms 30 to 60.

Figure 5:
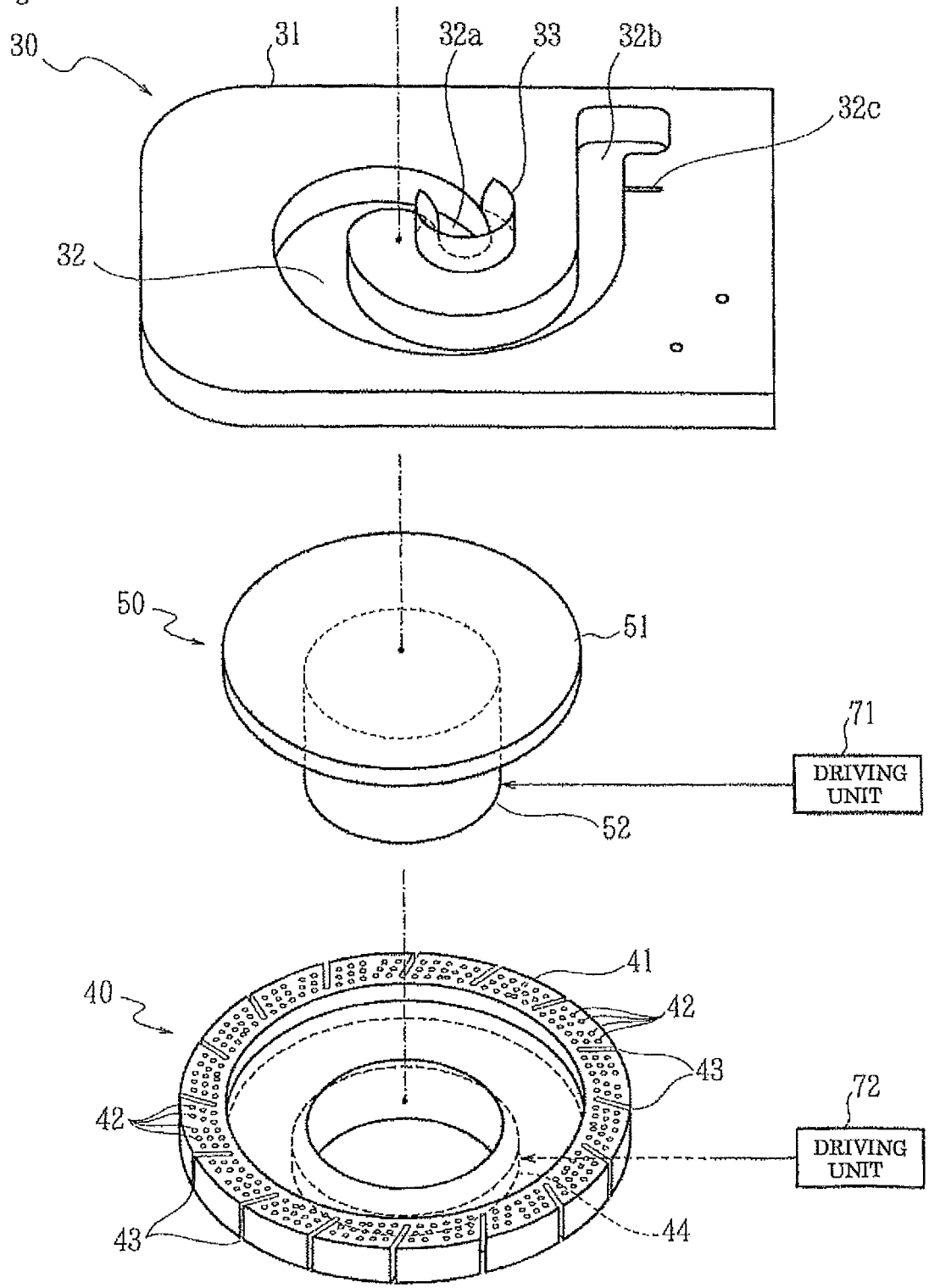
FIG. 5 is a developed perspective view of the main part (from alignment to cutting mechanisms) illustrated in FIG. 3.
Figure 6:
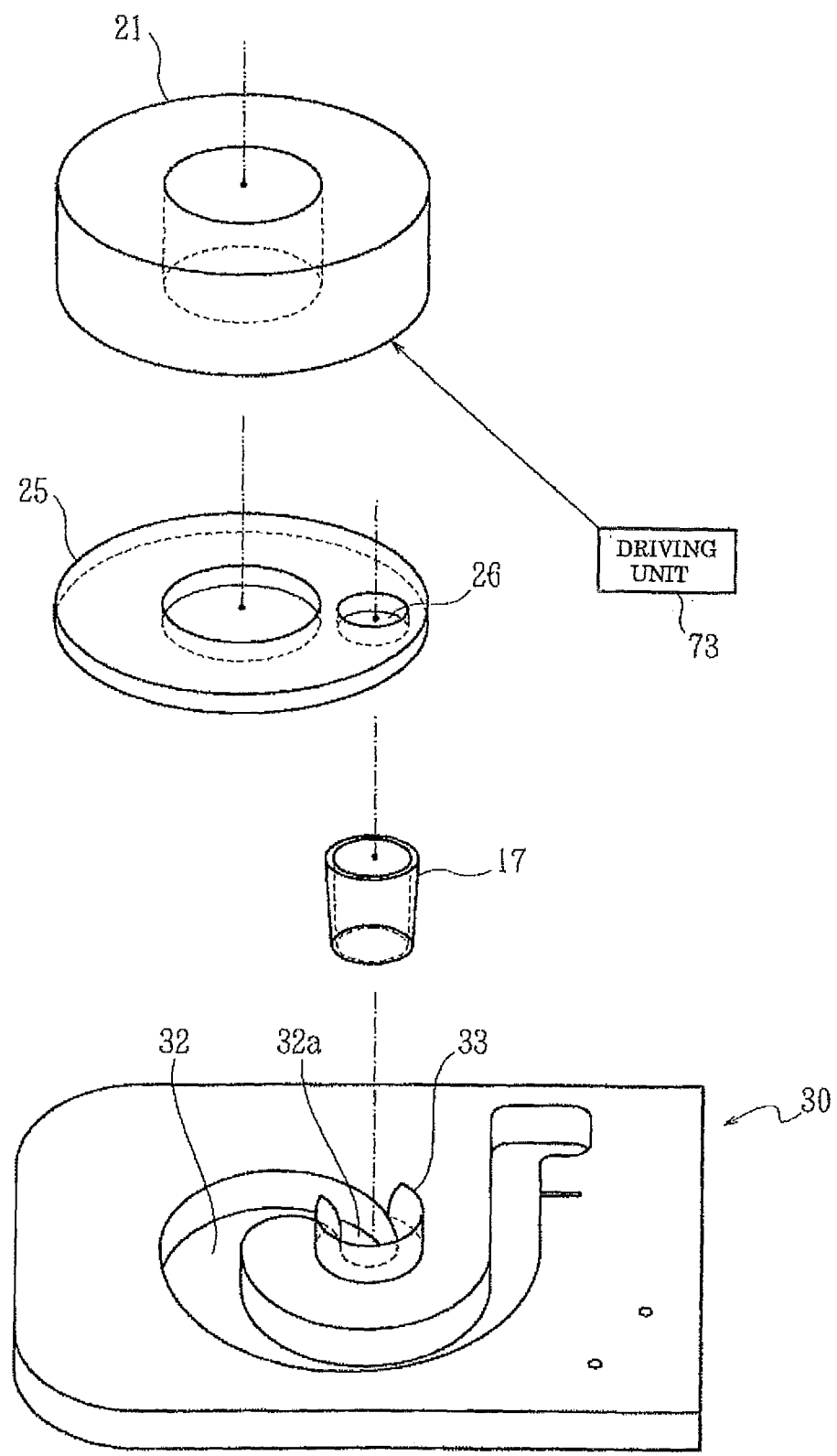
FIG. 6 is a developed perspective view of a medicine cassette.
Figure 7:
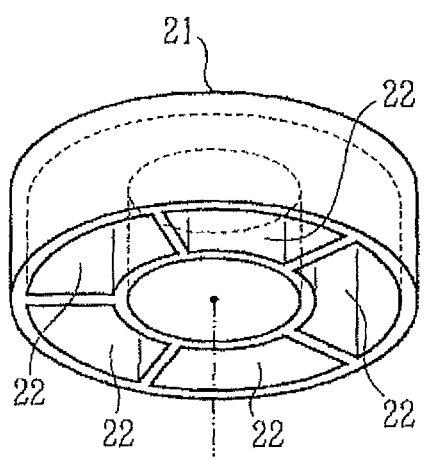
FIG. 7 is a perspective view of a container portion of the medicine cassette.

FIG. 5 is a developed perspective view of the tablet aligning and cutting mechanisms 30 to 60, and FIGS. 6 and 7 are developed perspective views of a medicine cassette 20.

The tablet splitting apparatus 10 illustrated in FIGS. 1 and 2 is a standalone tablet splitting apparatus including a free-standing housing 11.

The tablet splitting apparatus 10 includes an operation display unit 12 disposed in the front upper part of the housing 11, a control unit 13 internally mounted on the back side of the operation display unit 12, and a dust box 14 housed to be able to be pulled in and out from the front side of the housing 11.

The tablet splitting apparatus 10 also includes a tablet receiving box 15 housed to be able to be pulled in and out from the front side of the housing 11, and a chute 16 configured to guide split tablets (or halves 7 (described below) produced by cutting a tablet 5) into the tablet receiving box 15.

The tablet splitting apparatus 10 includes a straightening guide 30 serving as a tablet aligning mechanism and a tablet cutting mechanism 60 which are housed in the interior space of the housing 11 and located above the dust box 14 and the tablet receiving box 15. In the present, embodiment, the term "tablet aligning and cutting mechanisms 30 to 60" is used to refer to an assembly formed by the straightening guide 30, at large-diameter turntable 40, a small-diameter turntable 50, and the tablet cutting mechanism 60 that are integrally mounted, as illustrated in FIG. 3.

The tablet, splitting apparatus 10 also includes the medicine cassette 20 mounted above the tablet aligning and cutting mechanisms 30 to 60 in such a manner as to be removable from the top of the housing 11, and configured to feed tablets to the tablet aligning and cutting mechanisms 30 to 60.

The tablet aligning and cutting mechanisms 30 to 60 (see, e.g., FIGS. 3, 4, and 5) include the straightening guide 30 having a tabular shape and substantially horizontally secured, the large-diameter turntable 40 and the small-diameter turntable 50 disposed directly below the straightening guide 30, and a tablet holding and cutting base 65 mounted at one corner of the straightening guide 30 and extending on both the upper and lower sides of the straightening guide 30.

The straightening guide 30 includes a substrate 31 formed by a flat substantially rectangular plate, and a tablet receiving member 33 embedded in the upper surface of the substrate 31. The substrate 31 has a spiral tablet transfer path 32 serving as a guide portion. The tablet transfer path 32 is formed, for example, by drilling or wire cutting to vertically pass through the substrate 31.

At an inner end portion 32a (innermost end) of the tablet transfer path 32, a tablet receiving member 33 is mounted in such a manner as to widen and raise the inner wall of the inner end portion 32a. In this example, although optional, a long narrow blade insertion notch 32c into which a tablet cutting blade 70 can be loosely inserted is formed slightly before an outer end portion 32b (outermost end) of the tablet transfer path 32. The blade insertion notch 32c vertically passes through the substrate 31.

The tablet, transfer path 32 is formed, to define the path for transfer of tablets on the large-diameter turntable 40 and the small-diameter turntable 50. Therefore, the straightening guide 30 is disposed and secured directly above the large-diameter turntable 40 and the small-diameter turntable 50.

When the straightening guide 30 is disposed and secured directly above the large-diameter turntable 40 and the small-diameter turntable 50, the upper surfaces of the large-diameter turntable 40 and the small-diameter turntable 50 form the floor surface of the straightening guide 30. With this configuration, the tablet transfer path 32 is formed to connect the inner end portion 32a to the outer end portion 32b formed outside the outer periphery of the large-diameter turntable 40.

The large-diameter turntable 40 includes an annular portion 41 having a flat upper surface, and a driven portion 44 formed by an annular member slightly smaller in size than the annular portion 41. The driven portion 44 extends downward from the annular portion 41 in such a manner as to cover the periphery of the hollow part of the annular portion 41 from below.

The large-diameter turntable 40 is configured such that when the driven portion 44 is axially rotated by a driving unit 72, the annular portion 41 integrally rotatable with the driven portion 44 rotates in a plane. The driving unit 72 and the driven portion 44 are connected, for example, through belt transmission. The periphery of the annular portion 41 is provided with a plurality of blade insertion slits 43 that are evenly spaced and formed to vertically pass through the annular portion 41. The blade insertion slits 43 are all in the shape of a long narrow notch that is cut inward from the outermost periphery of the annular portion 41, and the notch width is slightly greater than the thickness of the tablet cutting blade 70. When each blade insertion slit 43 reaches a temporary holding area 62 in the tablet holding and cutting base 65 as the annular portion 41 rotates, the blade insertion slit 43 comes into alignment with a blade insertion notch 63 and allows loose insertion and passage of the tablet cutting blade 70 therethrough. The annular portion 41 has many small holes 42 which are formed in a scattered manner over substantially the entire area of the annular portion 41, except the portions having the blade insertion slits 43. The small holes 42 are small vertical holes vertically extending through the annular portion 41. The small holes 42 are each configured to block the passage of a tablet, but to allow the passage of cutting dust.

The small-diameter turntable 50 includes a disk portion 51 completely fit inside the annular portion 41 of the large-diameter turntable 40 and held directly below the straightening guide 30 in such a manner as to be rotatable in a plane, and a driven portion 52 extending downward from the rotation center of the disk portion 51. The small-diameter turntable 50 is configured such that the disk portion 51 rotates in a plane when the driven portion 52 is axially rotated by a driving unit 71 through belt transmission or the like. Although the upper surface of the disk portion 51 is flat in a macroscopic sense, it is finished to be rough enough in a microscopic sense to allow tablets thereon to be transferred by friction. The upper surface of the disk portion 51 is retained at the same height as the upper surface of the annular portion 41 of the large-diameter turntable 40.

When the small-diameter turntable 50 is kept inside the large-diameter turntable 40, the rotation center line (imaginary rotation axis line, indicated by a dot-and-dash line in FIG. 5) of the large-diameter turntable 40 coincides with that of the small-diameter turntable 50. However, this rotation center line does not pass through the tablet transfer path 32, which includes both the inner end portion 32a and the outer end portion 32b, in the straightening guide 30. The inner end portion 32a of the tablet transfer path 32 is located above the disk portion 51, and the outer end portion 32b of the tablet transfer path 32 is located radially outside the annular portion 41 of the large-diameter turntable 40. That is, the tablet transfer path 32 in the straightening guide 30 is a spiral groove that extends continuously over the upper surface of the disk portion 51 of the small-diameter turntable 50 and the upper surface of the annular portion 41 of the large-diameter turntable 40, from a point off the rotation center to a point outside the annular portion 41.

The substrate 31 is provided with the blade insertion notch 32c which allows loose insertion of the tablet cutting blade 70 therethrough at a portion which defines the outer periphery of the tablet transfer path 32, slightly before the outer end portion 32b of the tablet transfer path 32. The blade insertion notch 32c is formed to vertically pass through the substrate 31 and join the tablet transfer path 32.

The tablet holding and cutting base 65 is for mounting and supporting a tablet holding mechanism and the tablet cutting mechanism 60. The tablet holding mechanism is configured to reciprocate a tablet contact portion 64 with respect to the temporary holding area 62 located near the outer end portion 32b of the tablet transfer path 32, above the annular portion 41 of the large-diameter turntable 40. The tablet cutting mechanism 60 is configured to reciprocate the tablet cutting blade 70 with respect to the temporary holding area 62. In the temporary holding area 62, the blade insertion notch 63 similar to the blade insertion notch 32c in the straightening guide 30 is formed above and below the blade insertion notch 32c to vertically pass through the tablet holding and cutting base 65. A discharge port 61 which allows split tablets to drop downward toward the chute 16 is formed below the outer end portion 32b of the tablet transfer path 32, or below the outermost periphery of the annular portion 41 of the large-diameter turntable 40 in the vicinity of the outer end portion 32b.

For simplicity, the structure of the tablet holding mechanism and the tablet cutting mechanism 60 is not shown, except the tablet contact portion 64 (see FIG. 10)).

As illustrated in FIGS. 2 and 5, the medicine cassette 20 is mounted above the straightening guide 30, with many tablets randomly contained in the interior space thereof, and configured to drop and feed the tablets to the inner end portion 32a of the tablet transfer path 32 in the straightening guide 30.

The medicine cassette 20 is configured to be able to be easily and freely inserted into and removed from the housing 11 by pulling the whole or lower part of the medicine cassette 20 into and out of the housing 11 through an opening in the center of the top panel of the housing 11. It is not necessary to successively supply tablets, because the supply destination is the straightening guide 30. However, the inner end portion 32a of the tablet transfer path 32 has a less tablet capacity than the medicine cassette 20, even with the capacity of the tablet receiving member 33 added thereto. Therefore, the interior space of the medicine cassette 20 is divided into small spaces of an appropriate size.

Specifically, as illustrated in FIG. 6, the medicine cassette 20 includes a short cylindrical annular container portion 21 closed on one end face (first end face) thereof and open on the other end face (second end face) thereof, and a disk-shaped annular closing portion 25 attached to the container portion 21 so as to close the second end face (open end face) of the container portion 21.

When the closing portion 25 is attached to the container portion 21, the axial center of the container portion 21 coincides with that of the closing portion 25. The container portion 21 and the closing portion 25 are thus relatively axially rotatable about this axial center or rotation center line (imaginary rotation axis line, indicated by a two-dot chain line in FIG. 6).

The interior space of the container portion 21 is divided into a plurality of compartments 22 (five compartments in this example, see FIG. 7) annularly arranged side by side. The compartments 22 are each configured to accommodate and randomly hold an appropriate number of tablets for the tablet capacity of the inner end portion 32a.

The closing portion 25 has only one drop port 26 that passes therethrough and is smaller in size than the opening of each compartment 22. When the container portion 21 and the closing portion 25 are relatively axially rotated, with the closing portion 25 attached to the container portion 21, the drop port 26 moves sequentially from one compartment 22 to another of the container portion 21.

When the medicine cassette 20 is mounted above the straightening guide 30, with the closing portion 25 down and the container portion 21 up, and axially rotated to appropriately adjust the position of the drop port 26, then the center of the drop port 26 of the medicine cassette 20, the center of a guide tube 17 directly below the drop port 26, and the center of the inner end portion 32a below the guide tube 17 are vertically aligned in a straight line (imaginary vertical line, indicated by a dot-and-dash line in FIG. 6).

The guide tube 17 does not need to be provided if tablets dropped from the drop port 26 are unlikely to fall out of the tablet receiving member 33.

In the present embodiment, the driving unit includes the driving unit 71 configured to rotate the small-diameter turntable 50, the driving unit 72 configured to rotate the large-diameter turntable 40, a driving unit 73 configured to rotate the container portion 21 of the medicine cassette 20, and a given unit configured to reciprocate the tablet contact portion 64 and the tablet cutting blade 70.

The driving units described above are not shown in detail, because they may have any configuration that includes a drive source, such as an electric motor, and a transmission mechanism, such as a belt or gear, and is capable of causing an object (i.e., an object to be driven) to perform a predetermined operation in accordance with the control of the control unit 13. To bring the tablets in the tablet transfer path 32 into alignment, however, it is preferable that the driving unit 71 and the driving unit 72 adjust their outputs to make the angular speed of the large-diameter turntable 40 higher than the angular speed of the small-diameter turntable 50.

Applications and operations of the tablet splitting apparatus 10 (medicine feeder) according to the first embodiment will now be described with reference to the drawings.

FIGS. 7 to 10 are plan views of the tablet aligning and cutting mechanisms 30 to 60, and chronologically illustrate aligning, holding, and cutting of tablets.

Before use of the tablet splitting apparatus 10, the medicine cassette 20 outside (i.e., not yet mounted in) the tablet splitting apparatus 10 is placed in the orientation opposite that in the mounted state. That is, the medicine cassette 20 is placed, with the closing portion 25 up and the container portion 21 down, and an appropriate number of tablets 5 are inserted through the drop port 26 into one of the compartments 22.

The container portion 21 and the closing portion 25 are then relatively axially rotated by an amount corresponding to one compartment 22. This terminates the insertion of tablets into the one of the compartments 22. The same operation is repeated for other compartments 22 as necessary. After insertion of a sufficient number of tablets 5, the medicine cassette 20 is turned upside down (i.e., placed with the closing portion 25 down and the container portion 21 up) and attached to the housing 11, with the drop port 26 and the guide tube 17 positioned directly above the inner end portion 32a.

After making sure that the dust box 14 and the tablet receiving box 15 are inserted and attached to the housing 11, the operator operates the tablet splitting apparatus 10, using the operation display unit 12, to start a tablet splitting process. Under control of the control unit 13, the components 20 to 73 operate to automatically and sequentially perform a series of operations in which the tablets 5 are dropped and fed from the medicine cassette 20, separated and aligned by the tablet aligning mechanisms 30 to 50, and cut in the tablet holding and cutting base 65.

Specifically, first, the container portion 21 rotates by an amount corresponding to one compartment to bring one of the compartments 22 to be positioned above the drop port 26 of the closing portion 25. This allows a plurality of tablets 5 in this compartment 22 to drop into the inside of the tablet receiving member 33 at once or one after another. Thus, in a short period of time, a plurality of tablets 5 are randomly put into the inner end portion 32a of the tablet transfer path 32 in the straightening guide 30 (see FIG. 8).

Figure 8:
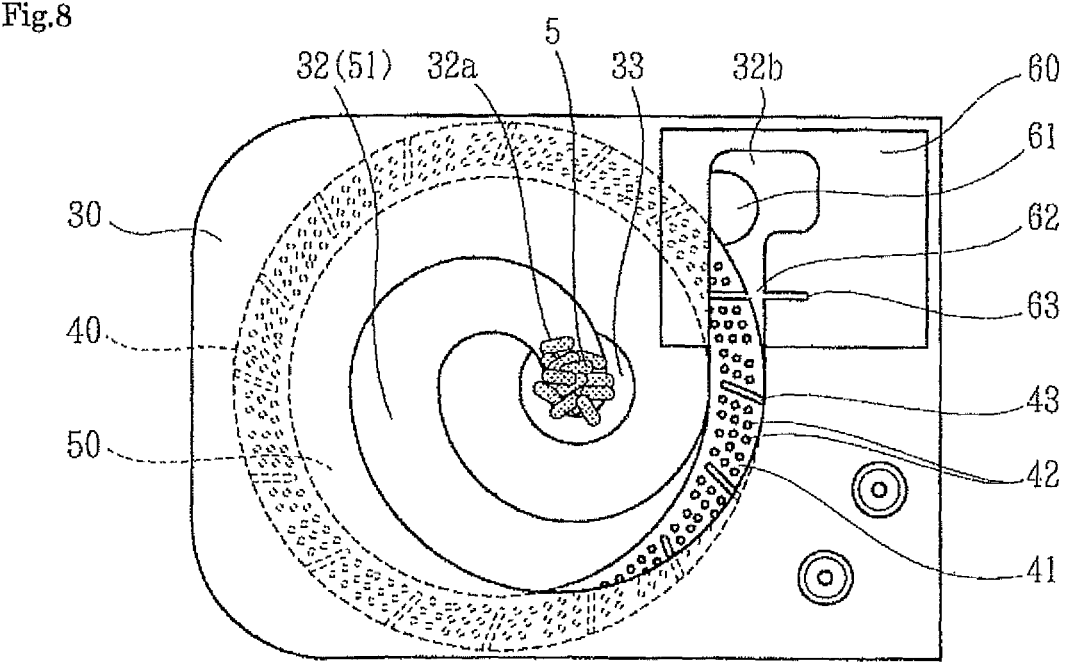
FIG. 8 is a diagram illustrating how the main part of the tablet splitting apparatus (medicine feeder) operates.
Figure 9:
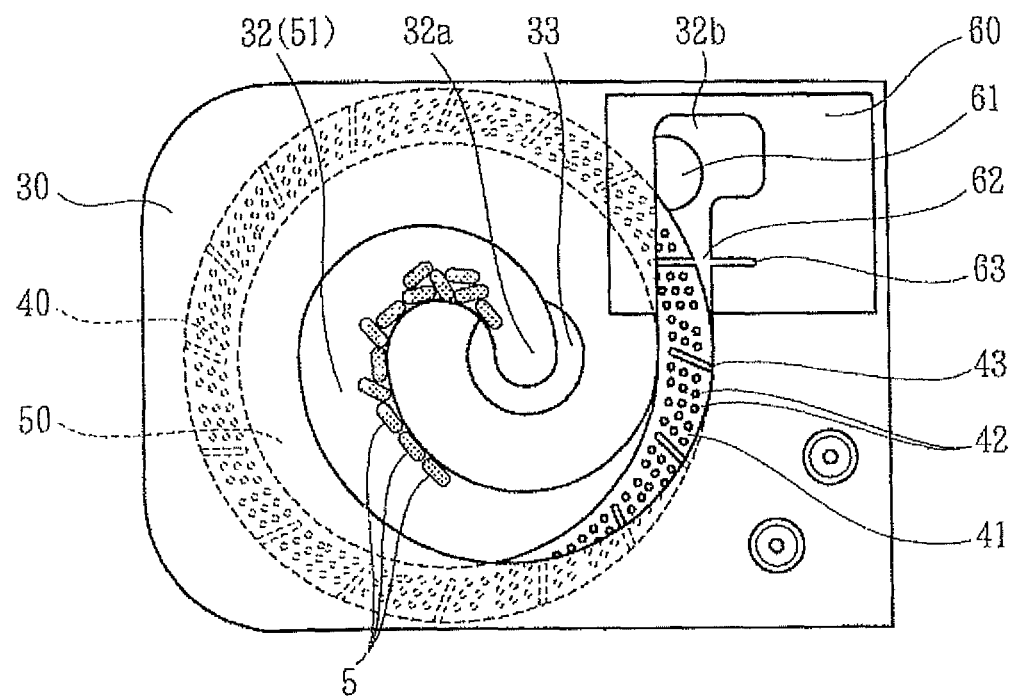
FIG. 9 is a plan view of the main part (from alignment to cutting mechanisms) illustrating how the tablet splitting apparatus (medicine feeder) operates.

The floor of the inner end portion 32a and middle part of the tablet transfer path 32, formed by a spiral groove, is defined by the upper surface of the disk portion 51 of the small-diameter turntable 50. As the small-diameter turntable 50 rotates in a plane, the tablets 5 are moved (as illustrated in FIGS. 8 and 9) outward in the radial direction, that is, from the inner end portion 32a to the middle part, and further to the annular portion 41 of the large-diameter turntable 40.

By this in-plane rotation, the tablets 5 are sequentially sent out from the inner end portion 32a. As the small-diameter turntable 50 rotates, the tablets 5 hit the inside groove face (which is one of fixed groove faces on both sides of the tablet transfer path 32) at an angle, and move along the groove face. The tablets 5 gradually speed up as the portion in contact with the tablet transfer path 32 moves outward in the radial direction. Therefore, even when the tablets 5 are on top of one another at and around the inner end portion 32a, they are brought into alignment in the middle of the tablet transfer path 32, as illustrated in FIG. 9, by the change in the speed of movement described above.

Figure 10:
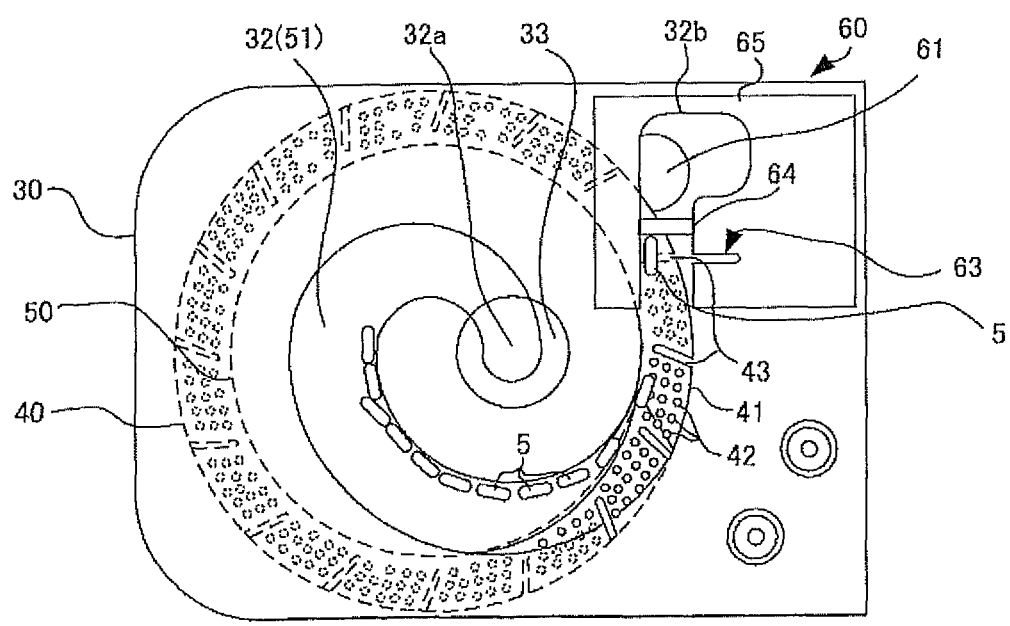
FIG. 10 is a plan view of the main part illustrating how the tablet splitting apparatus (medicine feeder) operates.

The tablets 5 are further transferred in the tablet transfer path 32. By the time the tablets 5 reach the periphery of the disk portion 51, adjacent ones of the tablets 5 are spaced slightly farther apart, as illustrated in FIG. 10. The tablets 5 are then transferred one by one onto the annular portion 41 of the large-diameter turntable 40.

Since the annular portion 41 rotates faster than the disk portion 51 as described above, the tablets 5 on the annular portion 41 are further accelerated and transferred to the temporary holding area 62 while being further separated from one another. Since the tablet contact portion 64 has already moved forward and positioned in the temporary holding area 62, the tablets 5 are each brought into contact with the tablet contact portion 64 and stopped in the temporary holding area 62.

Figure 11:
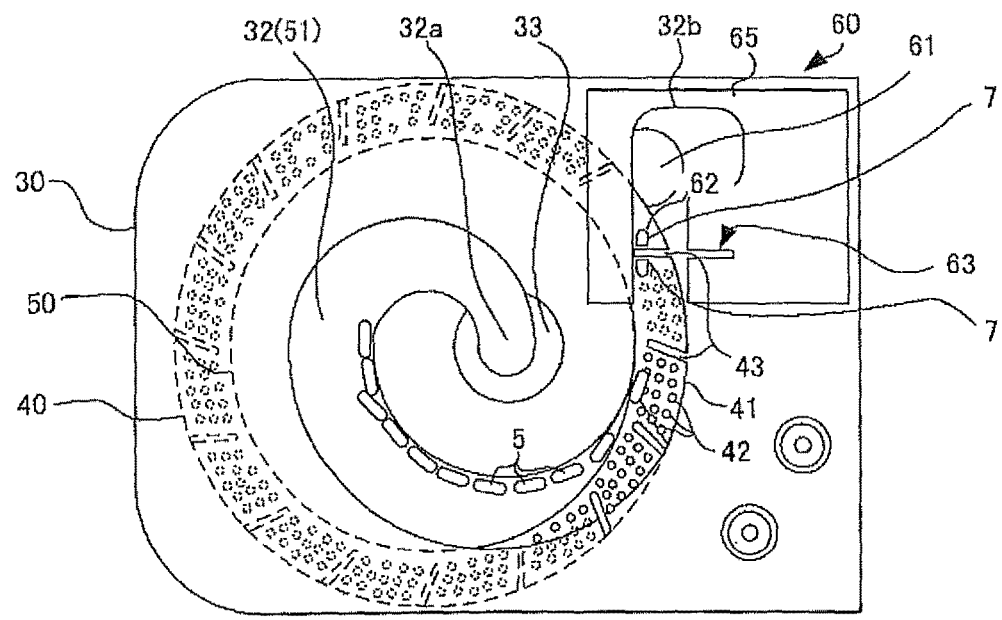
FIG. 11 is a plan view of the main part illustrating how the tablet splitting apparatus (medicine feeder) operates.

The annular portion 41 keeps rotating, and each time one of the blade insertion slits 43 reaches the temporary holding area 62 as the annular portion 41 rotates (as illustrated in FIGS. 10 and 11), the tablet cutting blade 70 immediately moves toward the blade insertion slit 43 and the blade insertion notch 63 and cuts the tablet 5 into two halves 7.

Figure 12:
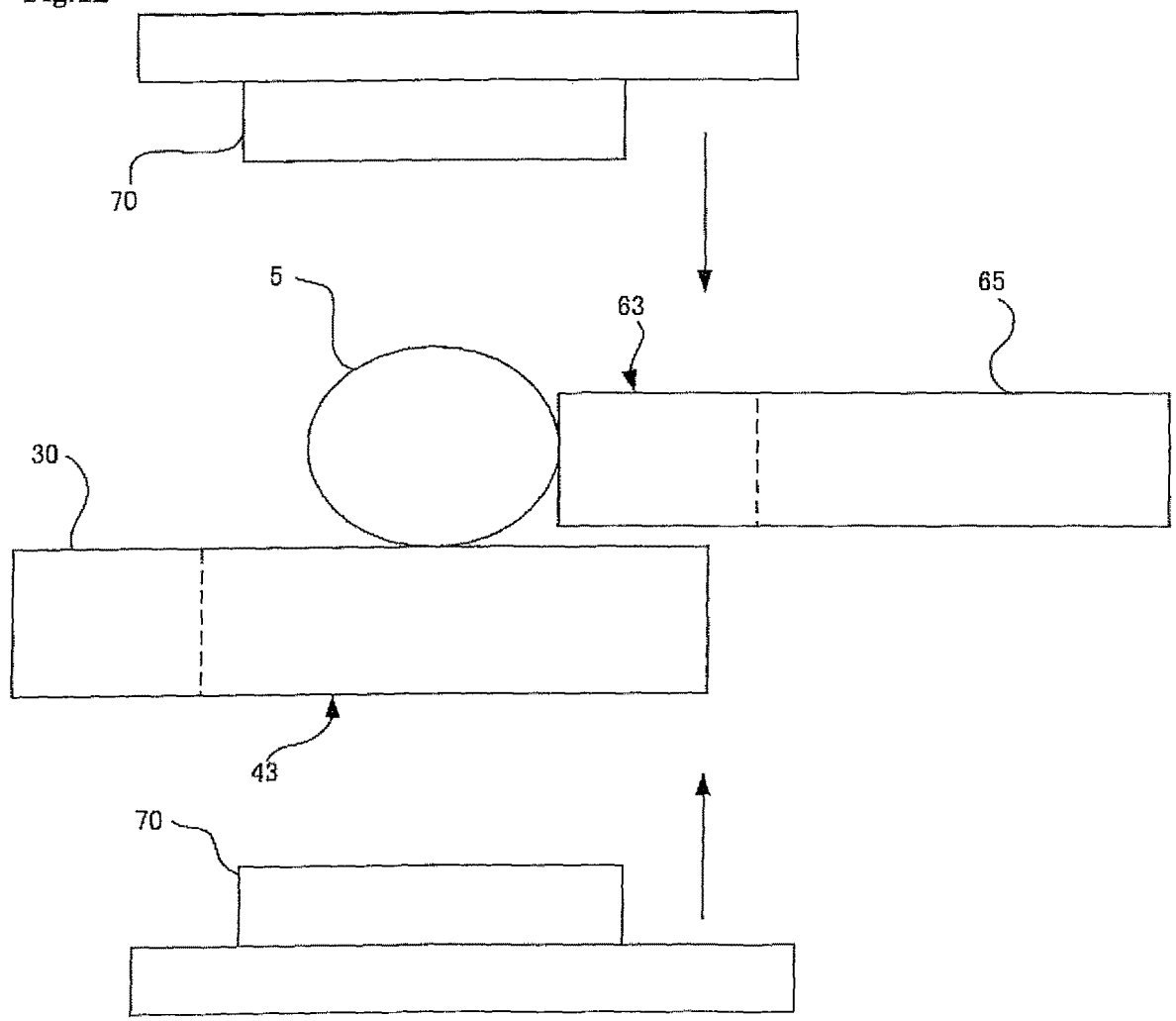
FIG. 12 is a diagram illustrating how a tablet cutting blade of the tablet splitting apparatus (medicine feeder) moves.

In the present embodiment, as illustrated in FIG. 12, the tablet cutting blade 70 is inserted into and removed from, the blade insertion slit 43 and the blade insertion notch 63 to cut the tablet 5 placed between upper and lower parts of the tablet cutting blade 70. The timing of this cutting can be adjusted, for example, when the driving unit adjusts the position of the blade insertion slit 43 in accordance with the phase rotation angle of the large-diameter turntable 40. At the same time, since the tablet contact portion 64 is withdrawn from the temporary holding area 62, the resulting two halves 7 of the tablet 5 are transferred to the outer end portion 32b of the tablet transfer path 32 as the annular portion 41 rotates. The two halves 7 are then swept away from the annular portion 41 and dropped into the discharge port 61.

From the discharge port 61, the two halves 7 are dropped onto the chute 16 below the discharge port 61, guided by the chute 16, and collected in the tablet receiving box 15.

By performing this process on each of the plurality of tablets 5 aligned in the tablet transfer path 32, all the tablets 5 contained in one compartment 22 of the medicine cassette 20 are split into two halves 7 and collected in the tablet receiving box 15. Through intermittent rotation of the medicine cassette 20, the process described above is also performed on the tablets 5 contained in the other compartments 22, so that all the tablets 5 in the medicine cassette 20 are split.

The tablets 5 produce dust while falling from the medicine cassette 20 onto the tablet transfer path 32 and being transferred in the tablet transfer path 32. The tablets 5 also produce dust while being cut in the temporary holding area 62. Such tablet dust falls downward through the small holes 42 or the blade insertion slits 43 in the annular portion 41 of the large-diameter turntable 40 and is collected in the dust box 14.

In the embodiment described above, the reciprocation position with respect to which the tablet contact portion 64 reciprocates has been simply referred to as the temporary holding area 62. In the temporary holding area 62, the extent to which the reciprocation position is shifted from the blade insertion notch 63 in the tablet transfer direction is preferably easily adjustable in accordance with the shape of the tablets 5.

For example, the adjustment described above may be made in accordance with data of the length and diameter of the tablets 5 entered in the control unit 13, or may be automatically made upon placing a sample tablet in a predetermined area of the tablet holding and cutting base 65.

In the present embodiment, the tablet cutting blade 70 is configured to be inserted and removed only when the blade insertion slit 43 and the blade insertion notch 63 are positioned opposite each other. However, if, for example, the large-diameter turntable 40 keeps moving for some reason, with the tablet cutting blade 70 positioned in the blade insertion slit 43, then the tablet cutting blade 70 collides with the blade insertion slit 43 and may be damaged.

Figure 13:
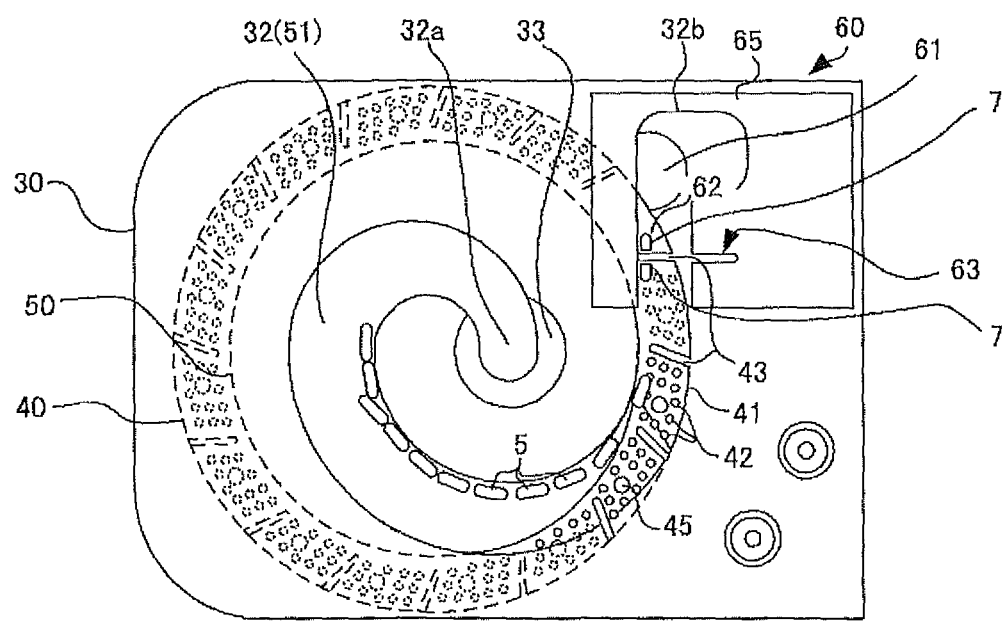
FIG. 13 is a diagram illustrating a modification of the tablet splitting apparatus (medicine feeder).

Accordingly, as illustrated in FIG. 13, the annular portion 41 of the large-diameter turntable 40 may have blade retaining holes 45 vertically passing therethrough, in addition to the small holes 42 described above.

The blade retaining holes 45 are circular through-holes larger in diameter than the small holes 42. The blade retaining holes 45 have a diameter large enough to allow insertion of a blade retaining pin 67 that moves up and down simultaneously with the tablet cutting blade 70.

The blade retaining pin 67 has a smaller diameter than the small holes 42.

When the large-diameter turntable 40 rotates to allow the blade insertion slit 43 and the blade insertion notch 63 to be positioned opposite each other, the corresponding blade retaining hole 45 is located at a position which allows the blade retaining pin 67 to be fitted therein.

With this configuration, when each tablet 5 reaches the temporary holding area 62, the blade retaining pin 67 is fitted into the corresponding blade retaining hole 45 to temporarily stop the rotation of the large-diameter turntable 40. This facilitates up-and-down motion of the tablet cutting blade 70 and reduces the risk of damage to the tablet cutting blade 70.

In the embodiment described above, the two halves 7 into which each tablet 5 is cut by the tablet cutting blade 70 in the temporary holding area 62 are discharged one after another by the large-diameter turntable 40 into the discharge port 61. However, other configurations may be used. Specifically, to distinctly control the individual discharge timing of the halves 7, the tablet cutting blade 70 may be at least partially temporarily stopped directly above the large-diameter turntable 40 after cutting, instead of being entirely withdrawn from the temporary holding area 62 immediately after cutting, so as to cause transfer of the succeeding half 7 to start later than the start of transfer of the preceding half 7.

The tablet cutting blade, which has not been described in detail in the embodiment, may be of a single-blade type. However, to reduce load on the annular portion 41 (which is a movable part) and the like, it is preferable that the tablet cutting blade be of a double-blade type that holds a target tablet (i.e., tablet to be cut) between the upper and lower parts and allows it to temporarily (even slightly) rise from the annular portion 41.

Although the tablet splitting apparatus 10 described in the embodiment is of a standalone type, it may be of a mountable type which is suitable for being included in a medicine packaging machine. Such a mountable tablet splitting apparatus can be obtained by removing the operation display unit 12 and the tablet receiving box 15 and then enabling the destination of split tablets guided by the chute 16 to also serve as the destination of tablets discharged from a typical medicine feeder.

In the embodiment described above, the container portion 21 of the medicine cassette 20 does not have a medicine input or supply port, and the drop port 26 in the closing portion 25 through which medicines are dropped also serves as a medicine input or supply port. However, the container portion 21 may have a medicine input or supply port. For example, at least one of the many compartments 22 in the container portion 21 may have an input or supply port in an area outside the opening closed by the closing portion 25, such as an area opposite the opening.

INDUSTRIAL APPLICABILITY

The medicine feeder of the present invention has been developed primarily for the purpose of being applied to tablet, splitting apparatuses, but the application is not limited to tablet splitting apparatuses. Other applications are possible and useful, as long as being low-profile and being capable of successively feeding tablets at appropriate intervals are beneficial.

The tablet splitting apparatus of the present invention is applicable not only to a standalone type such as that described in the embodiment, but also to a mountable type which is capable of being included, for example, in a medicine packaging machine. In the medicine packaging machine, the mountable tablet splitting apparatus may be replaced one-to-one with a basic medicine feeder having no capability of splitting tablets, or may be mounted downstream of the basic medicine feeder in the form of cascade connection.

REFERENCE SIGNS LIST

5: tablet (medicine), 7: half (split tablet),
10: tablet, splitting apparatus (medicine feeder),
11: housing, 12: operation display unit,
13: control unit, 14: dust box, 15: tablet receiving box, 16: chute, 17: guide tube,
20: medicine cassette,
21: container portion, 22: compartment,
25: closing portion, 26: drop port,
30: straightening guide (tablet aligning mechanism),
31: substrate, 32: tablet, transfer path (medicine transfer path), 32a: inner end portion,
32b: outer end portion, 32c: blade insertion notch, 33: tablet receiving member,
40: large-diameter turntable (aligning mechanism),
41: annular portion, 42: small hole, 43: blade insertion slit, 44: driven portion,
50: small-diameter turntable (aligning mechanism),
51: disk portion, 52: driven portion,
60: tablet cutting mechanism (tablet holding mechanism, tablet cutting mechanism),

61: discharge port, 62: temporary holding area, 63: blade insertion notch, 64: tablet contact portion, 65: tablet holding and cutting base, 70: tablet cutting blade

71, 72, 73: driving unit

The invention claimed is:

1. A medicine feeder comprising:
a circular small-diameter turntable having a flat upper surface;
a large-diameter turntable having an annular upper surface and disposed outside an outer periphery of the small-diameter turntable;
a driving unit configured to cause the small-diameter turntable and the large-diameter turntable to coaxially rotate in a plane;
a straightening guide having a spiral guide portion configured to guide medicines on the small-diameter turntable and/or large-diameter turntable, the straightening guide being disposed to allow the upper surfaces of the small-diameter turntable and large-diameter turntable to form a floor of the guide portion;
a tablet contact portion configured to stop the tablet in a temporary holding area in the guide portion, the temporary holding area being located above the large-diameter turntable;
a tablet holding mechanism configured to reciprocate the tablet contact portion; and
a tablet cutting mechanism including a tablet cutting blade and configured to reciprocate the tablet cutting blade with respect to the tablet held by the tablet contact portion,
wherein the driving unit makes an angular speed of the large-diameter turntable higher than an angular speed of the small-diameter turntable, and
the guide portion and the upper surfaces of the small-diameter turntable and large-diameter turntable form a transfer path in such a manner as to connect an inner end portion formed off a center of the in-plane rotation to an outer end portion formed outside an outer periphery of the large-diameter turntable, the transfer path being a path for transferring the tablets.

2. The medicine feeder according to claim 1, wherein the large-diameter turntable has many small holes vertically passing through the upper surface thereof.

3. The medicine feeder according to claim 2, further comprising:
a medicine cassette removably mounted above the straightening guide and configured to drop and feed medicines onto the inner end portion of the transfer path,
wherein the medicine cassette includes a container portion configured to accommodate many medicines, and a closing portion configured to close an opening of the container portion, the closing portion being attached to the container portion in such a manner that the container portion is axially rotated relative to the closing portion, wherein
the container portion includes a plurality of compartments annularly arranged side by side,
the closing portion has a drop port passing therethrough, an area of the drop port being smaller than an area of the compartments covered by the closing portion, and
when the container portion is axially rotated relative to the closing portion, with the closing portion attached to the container portion, the medicines in only one compartment is discharged through the drop port at a time.

4. The medicine feeder according to claim 1, further comprising:
a medicine cassette removably mounted above the straightening guide and configured to drop and feed medicines onto the inner end portion of the transfer path,
wherein the medicine cassette includes a container portion configured to accommodate many medicines, and a closing portion configured to close an opening of the container portion,
the closing portion being attached to the container portion in such a manner that the container portion is axially rotated relative to the closing portion,
the container portion includes a plurality of compartments annularly arranged side by side,
the closing portion has a drop port passing therethrough, an area of the drop port being smaller than an area of narrower than the compartments covered by the closing portion, and
when the container portion is axially rotated relative to the closing portion, with the closing portion attached to the container portion, the medicines in only one compartment is discharged through the drop port at a time.

5. The tablet splitting apparatus according to claim 1, wherein the large-diameter turntable has a slit passing therethrough, the slit being configured to allow the tablet cutting blade to be loosely inserted therein.

6. A medicine feeder comprising:
a circular or annular turntable having a flat upper surface;
a driving unit configured to rotate the turntable in a plane;
a fixed straightening guide disposed directly above the turntable and configured to define a transfer path for transferring medicines on the turntable;
a tablet holding mechanism configured to reciprocate a tablet contact portion with respect to a temporary holding area in the transfer path, the temporary holding area being located above the large-diameter turntable; and
a tablet cutting mechanism configured to reciprocate a tablet cutting blade with respect to the temporary holding area,
wherein the turntable includes a small-diameter turntable and a large-diameter turntable disposed outside an outer periphery of the smaller-diameter turntable,
the driving unit makes an angular speed of the large-diameter turntable higher than an angular speed of the small-diameter turntable, and
the transfer path of the straightening guide is a spiral path extending continuously over the upper surface of the small-diameter turntable and the upper surface of the large-diameter turntable, from a point off a rotation center to a point outside the large-diameter turntable.

7. The medicine feeder according to claim 6, wherein the large-diameter turntable has many small holes vertically passing therethrough.

8. The medicine feeder according to claim 7, further comprising:
a medicine cassette removably mounted above the straightening guide and configured to drop and feed medicines onto an inner end portion of the transfer path, wherein the medicine cassette includes a container portion configured to accommodate and randomly hold many medicines, and a closing portion configured to close an opening of the container portion, the closing portion being attached to the container portion in such a manner that the container portion is axially rotated relative to the closing portion, wherein an interior space of the container portion is divided into a plurality of compartments annularly arranged side by side, the compartments are each configured to accommodate and randomly hold a plurality of medicines, the closing portion has a drop port passing therethrough, an area of the drop port is smaller than an area of the compartments covered by the closing portion, and when the container portion is axially rotated relative to the closing portion, with the closing portion attached to the container portion, the medicines in only one compartment is discharged through the drop port at a time.

9. The medicine feeder according to claim 6, further comprising:

a medicine cassette removably mounted above the straightening guide and configured to drop and feed medicines onto an inner end portion of the transfer path, wherein the medicine cassette includes a container portion configured to accommodate and randomly hold many medicines, and a closing portion configured to close an opening of the container portion, the closing portion being attached to the container portion in such a manner that the container portion is axially rotated relative to the closing portion; an interior space of the container portion is divided into a plurality of compartments annularly arranged side by side, the compartments are each configured to accommodate and randomly hold a plurality of medicines, the closing portion has a drop port passing therethrough, an area of the drop port being smaller than an area of the compartments covered by the closing portion, and when the container portion is axially rotated relative to the closing portion, with the closing portion attached to the container portion, the medicines in only one compartment is discharged through the drop port at a time.

10. The tablet splitting apparatus according to claim 6, wherein the large-diameter turntable has a long narrow slit passing therethrough, the slit being configured to allow the tablet cutting blade to be loosely inserted therein.

* * * * *